(12) United States Patent
Seo et al.

(10) Patent No.: US 10,104,533 B2
(45) Date of Patent: Oct. 16, 2018

(54) METHOD FOR TRANSMITTING AND RECEIVING SIGNAL IN WIRELESS COMMUNICATION SYSTEM AND APPARATUS FOR PERFORMING SAME

(71) Applicant: LG ELECTRONICS INC., Seoul (KR)

(72) Inventors: Inkwon Seo, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/525,000

(22) PCT Filed: Nov. 13, 2015

(86) PCT No.: PCT/KR2015/012223
§ 371 (c)(1),
(2) Date: May 5, 2017

(87) PCT Pub. No.: WO2016/076661
PCT Pub. Date: May 19, 2016

(65) Prior Publication Data
US 2017/0339546 A1    Nov. 23, 2017

Related U.S. Application Data

(60) Provisional application No. 62/079,584, filed on Nov. 14, 2014.

(51) Int. Cl.
*G01R 31/08*    (2006.01)
*H04W 8/00*    (2009.01)
(Continued)

(52) U.S. Cl.
CPC ......... *H04W 8/005* (2013.01); *H04L 27/2628* (2013.01); *H04W 8/22* (2013.01);
(Continued)

(58) Field of Classification Search
CPC ...................................... H04W 8/005
See application file for complete search history.

(56) References Cited

U.S. PATENT DOCUMENTS

| 2011/0306349 A1* | 12/2011 | Hakola | H04W 28/04 455/450 |
| 2012/0163160 A1* | 6/2012 | Himayat | H04W 28/06 370/216 |

(Continued)

OTHER PUBLICATIONS

PCT International Application No. PCT/KR2015/012223, Written Opinion of the International Searching Authority dated Feb. 22, 2016, 19 pages.

*Primary Examiner* — Gerald A Smarth
(74) *Attorney, Agent, or Firm* — Lee, Hong, Degerman, Kang & Waimey

(57) ABSTRACT

A method for transmitting a signal by device to device (D2D) user equipment (UE) supporting D2D communication, according to one embodiment of the present invention, comprises the steps of: receiving, from a base station, a message which requests reporting of the UE category of the D2D UE; and reporting the D2D UE category for a D2D operation of the D2D UE, which is set independently of the UE category for communication with the base station, wherein the D2D UE category is set on the basis of the number of fast Fourier transform (FFT) operations for asynchronous D2D links which the D2D UE can simultaneously process, and the data rate for the asynchronous D2D links which the D2D UE can process per unit time.

15 Claims, 14 Drawing Sheets

(a)

(b)

(51) Int. Cl.
*H04W 24/10* (2009.01)
*H04W 48/16* (2009.01)
*H04L 27/26* (2006.01)
*H04W 56/00* (2009.01)
*H04W 8/22* (2009.01)
*H04W 88/02* (2009.01)
*H04W 88/08* (2009.01)
*H04W 88/04* (2009.01)

(52) U.S. Cl.
CPC ........... *H04W 24/10* (2013.01); *H04W 48/16* (2013.01); *H04W 56/001* (2013.01); *H04W 88/02* (2013.01); *H04W 88/04* (2013.01); *H04W 88/08* (2013.01)

(56) References Cited

U.S. PATENT DOCUMENTS

| | | |
|---|---|---|
| 2013/0215814 A1 | 8/2013 | Lee et al. |
| 2014/0112194 A1 | 4/2014 | Novlan et al. |
| 2014/0146907 A1 | 5/2014 | Kim et al. |
| 2014/0185530 A1 | 7/2014 | Kuchibhotla et al. |
| 2014/0269409 A1* | 9/2014 | Dimou ................. B23K 10/003 370/254 |
| 2014/0335853 A1 | 11/2014 | Sartori et al. |
| 2015/0131568 A1* | 5/2015 | You .......................... H04L 5/001 370/329 |
| 2015/0131749 A1* | 5/2015 | Slomina ................. H04J 11/005 375/260 |
| 2015/0319771 A1* | 11/2015 | Hill ......................... H04W 4/70 370/330 |

* cited by examiner

FIG. 5
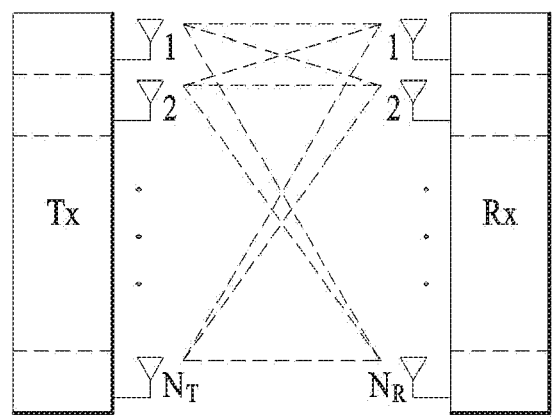
(a)
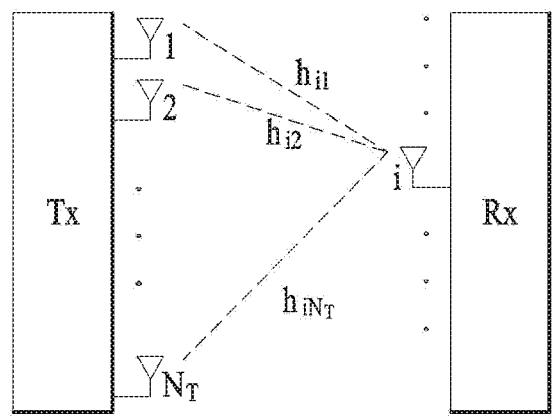
(b)

METHOD FOR TRANSMITTING AND RECEIVING SIGNAL IN WIRELESS COMMUNICATION SYSTEM AND APPARATUS FOR PERFORMING SAME

CROSS-REFERENCE TO RELATED APPLICATIONS

This application is the National Stage filing under 35 U.S.C. 371 of International Application No. PCT/KR2015/012223, filed on Nov. 13, 2015, which claims the benefit of U.S. Provisional Application No. 62/079,584, filed on Nov. 14, 2014, the contents of which are all hereby incorporated by reference herein in their entirety.

TECHNICAL FIELD

The present invention relates to a wireless communication system, and more particularly, to a method for a D2D UE supporting D2D (device to device) communication to transmit and receive a signal with a base station and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

A technical task of the present invention is to provide a method of enhancing reliability of a D2D UE and a method of efficiently performing a D2D operation by setting a UE category for the D2D operation independent of a legacy UE category for eNB-UE communication and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a signal by a device to device (D2D) user equipment (UE) supporting D2D communication, includes receiving a message which requests reporting of a UE category of the D2D UE from a base station and reporting a D2D UE category for a D2D operation of the D2D UE, the D2D UE category being configured independently of a UE category for communication with the base station. In this case, the D2D UE category can be configured based on a number of fast Fourier transform (FFT) operations for asynchronous D2D links capable of being simultaneously processed by the D2D UE and a data rate for the asynchronous D2D links capable of being processed per unit time by the D2D UE.

To further achieve these and other advantages and in accordance with the purpose of the present invention, according to another embodiment, a device to device (D2D) user equipment (UE) supporting D2D communication includes a receiver configured to receive a message which requests reporting of a UE category of the D2D UE from a base station, and a processor configured to report a D2D UE category for a D2D operation of the D2D UE, the D2D UE category being configured independently of a UE category for communication with the base station. In this case, the D2D UE category may be configured based on a number of fast Fourier transform (FFT) operations for asynchronous D2D links capable of being simultaneously processed by the D2D UE and a data rate for the asynchronous D2D links capable of being processed per unit time by the D2D UE.

To further achieve these and other advantages and in accordance with the purpose of the present invention, according to a further different embodiment, a method of receiving a signal by a base station from a device to device (D2D) user equipment (UE) supporting D2D communication, includes transmitting a message which requests reporting of a UE category to the D2D UE, and receiving a report on a D2D UE category for a D2D operation of the D2D UE, the D2D UE category being configured independently of a UE category for communication with the base station. In this case, the D2D UE category may be configured based on a number of fast Fourier transform (FFT) operations for asynchronous D2D links capable of being simultaneously processed by the D2D UE and a data rate for the asynchronous D2D links capable of being processed per unit time by the D2D UE.

Preferably, the D2D UE category can be differently configured for a case that the D2D UE performs D2D communication with an another D2D UE and a case that the D2D UE performs a discovery operation on the another D2D UE.

Preferably, if the reported D2D UE category indicates that the D2D UE is able to process FFT operation for at least two asynchronous links at a same time, the D2D UE may operate as a relay for an another D2D UE.

Preferably, the D2D UE may receive, from the base station, a message which requests relaying of an another D2D UE located at an outside of a coverage of the base station and relay a broadcast signal received from the base station to the another D2D UE having a synchronization timing different from a synchronization timing of the base station.

Preferably, the D2D UE may measure a D2D signal received from an another D2D UE located an outside of a coverage of the base station, report a measurement result of the D2D signal to the base station, and receive a message which requests relaying of the another D2D UE based on the reported measurement result of the D2D signal and the reported D2D UE category.

Advantageous Effects

According to one embodiment of the present invention, it is able to enhance reliability of a D2D UE and efficiently perform a D2D operation for asynchronous multiple D2D links by setting a D2D UE category in consideration of the number of FFT operations of asynchronous links capable of being simultaneously processed by the D2D UE and a data rate for the asynchronous links.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

FIG. 5 is a diagram showing the configuration of a wireless communication system having multiple antennas.

BEST MODE

Mode for Invention

Figure 1:
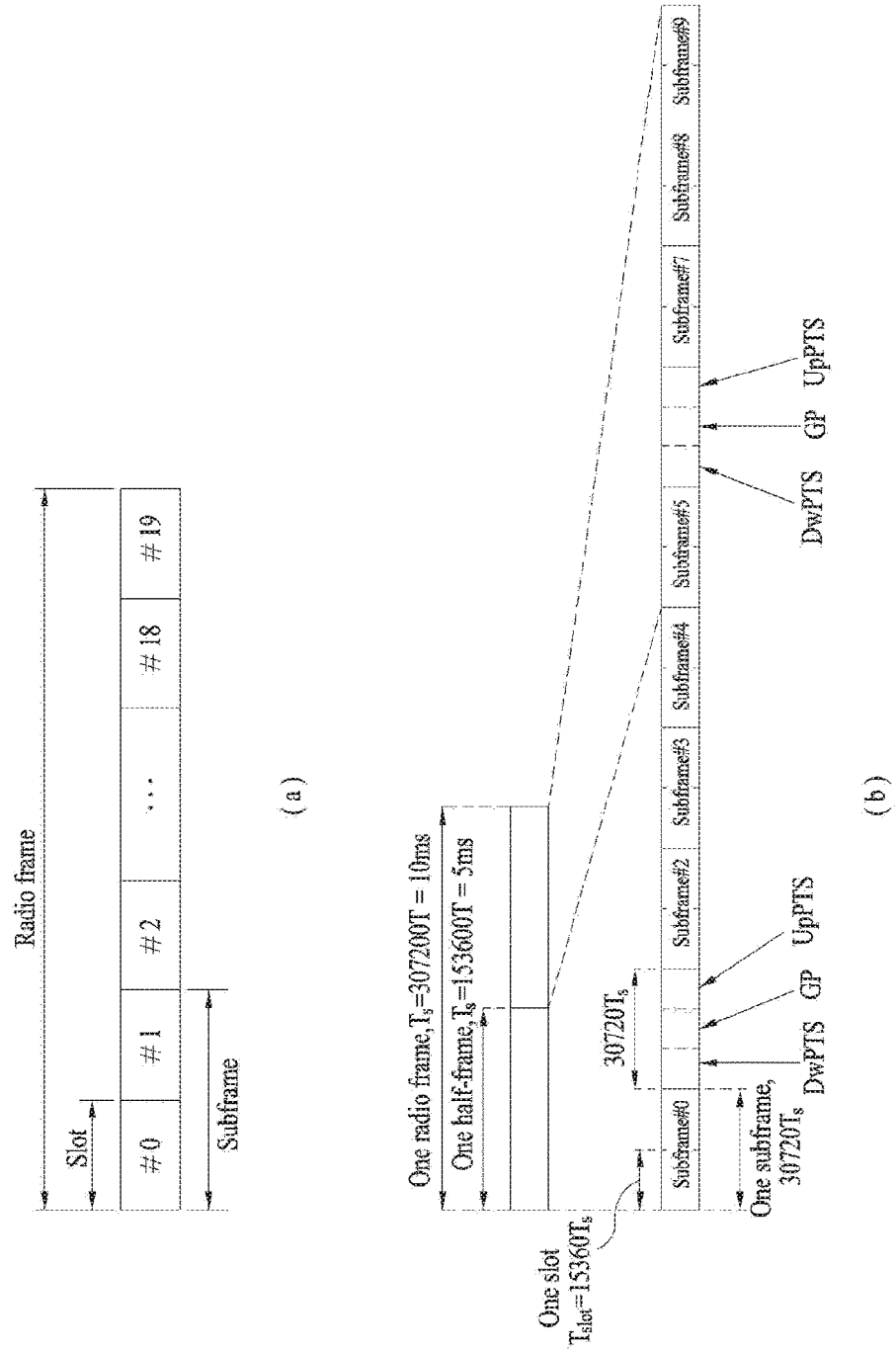
FIG. 1 is a diagram showing the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
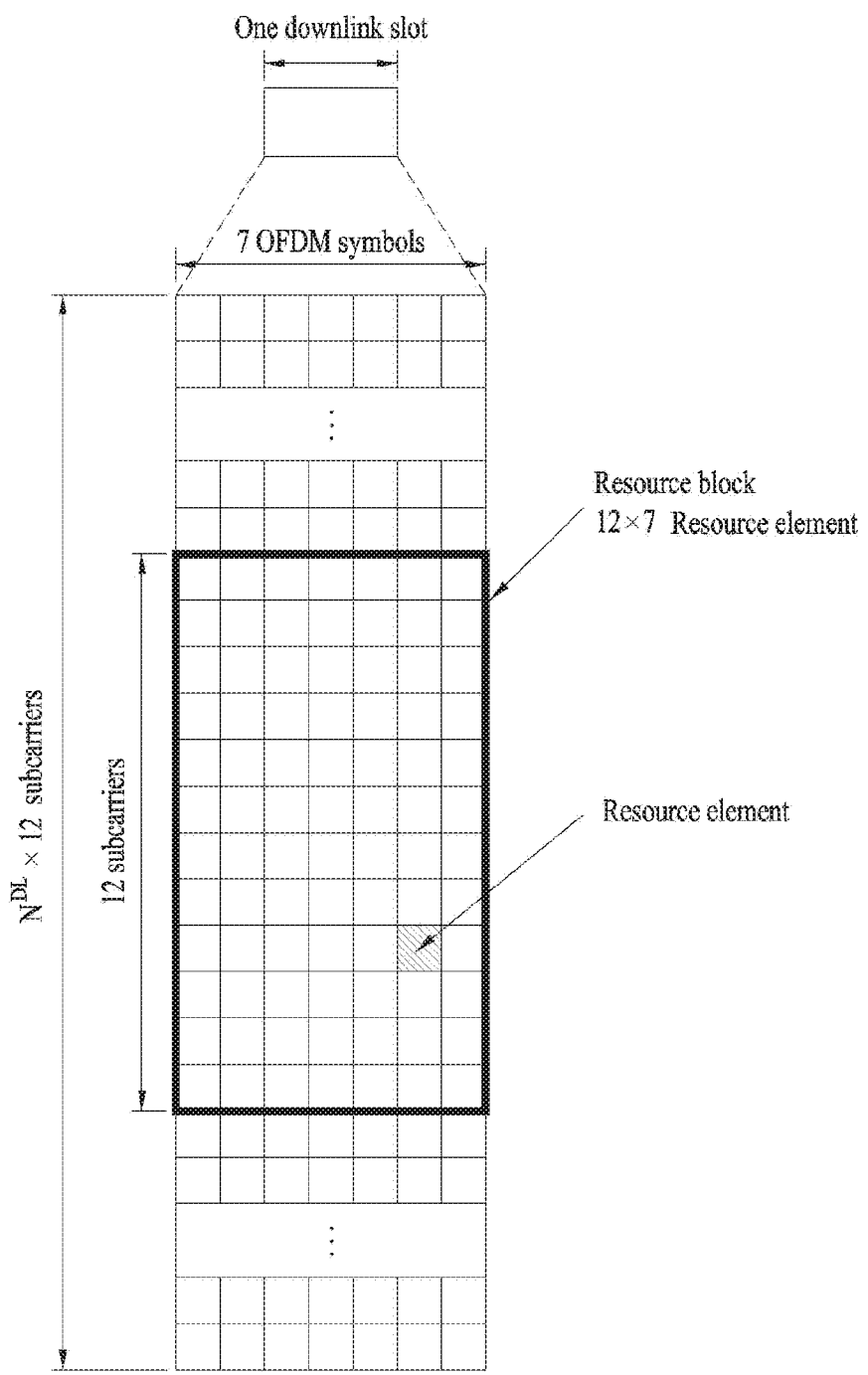
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
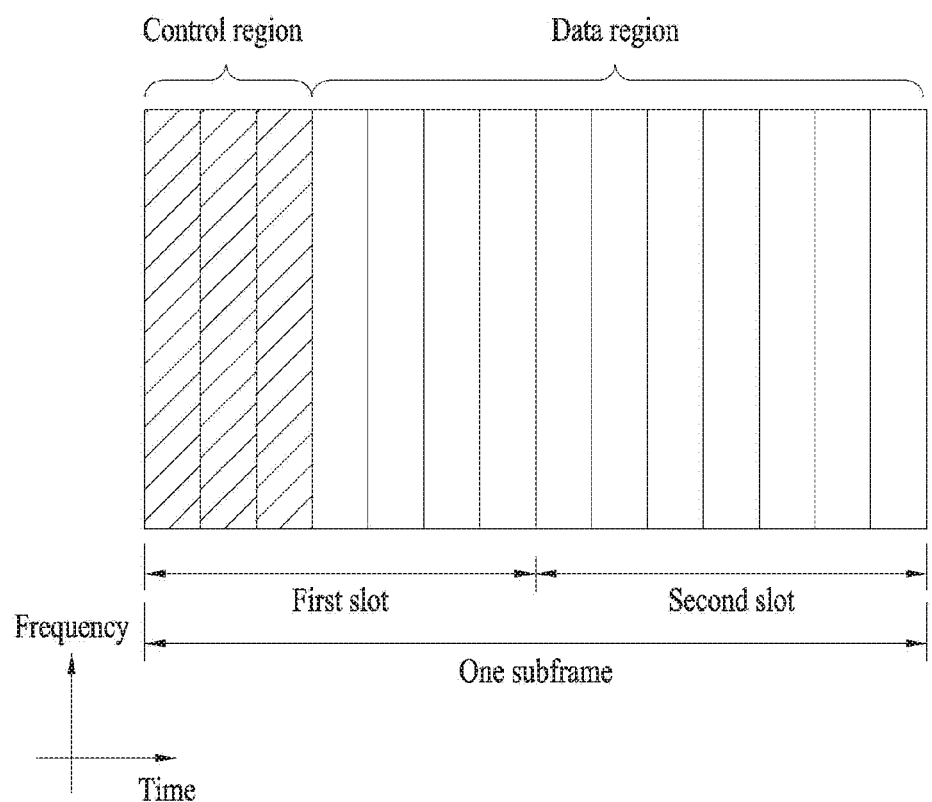
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
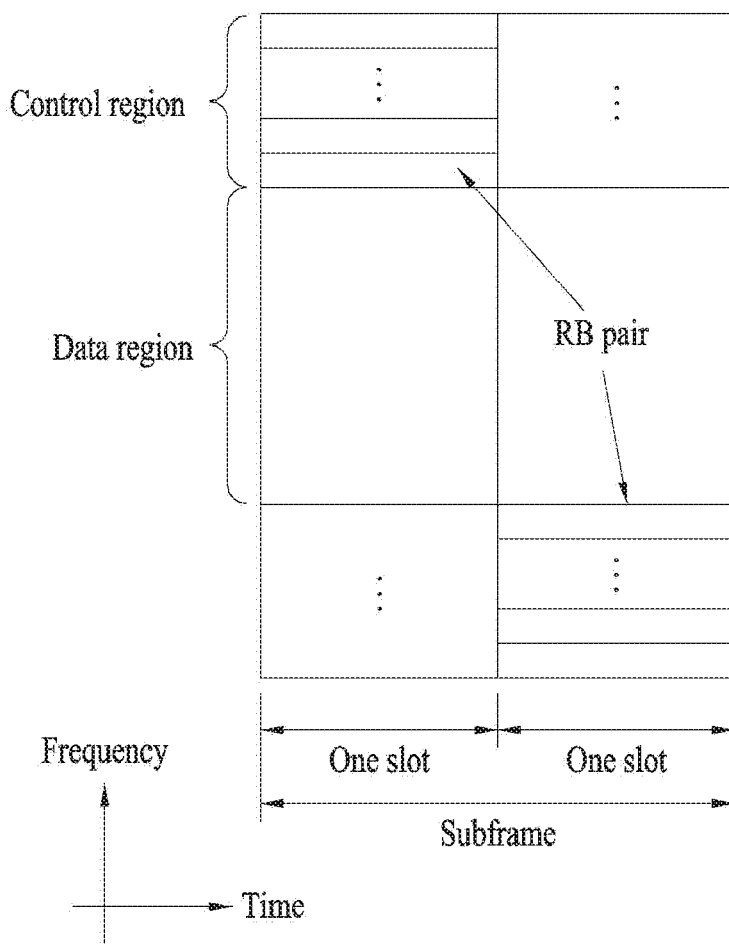
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector ŝ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y=[y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T=[h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n=[n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

PSS (Primary Synchronous Signal)/SSS (Secondary Synchronous Signal)

Figure 6:
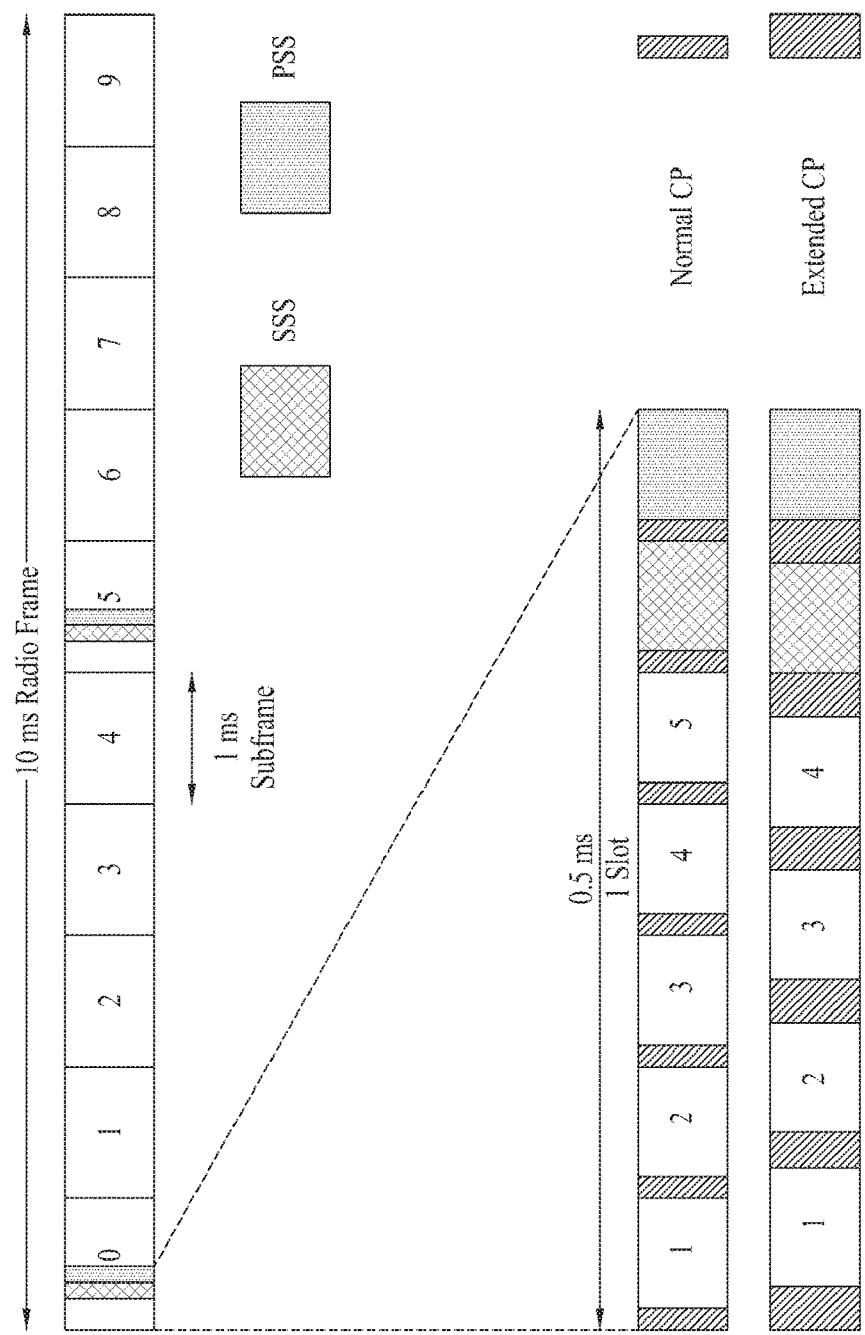
FIG. 6 is a diagram of PSS and SSS of a 3GPP system.

FIG. 6 is a diagram for explaining a PSS and an SSS corresponding to synchronization signals used for a cell search in LTE/LTE-A system. Before the PSS and the SSS are explained, a cell search is explained. When a user equipment initially accesses a cell, the cell search is performed for a case of performing a handover from the currently accessed cell to a different cell, a case of reselecting a cell or the like. The cell search may include acquisition of frequency and symbol synchronization for a cell, acquisition of downlink frame synchronization for a cell and determination of a cell identifier (ID). One cell group consists of three cell identifiers and there may exist 168 cell groups.

An eNB transmits a PSS and an SSS to perform a cell search. A user equipments obtains 5 ms timing of a cell by detecting the PSS and may be able to know a cell identifier included in a cell group. And, the user equipment is able to know radio frame timing and a cell group by detecting the SSS.

Referring to FIG. 6, a PSS is transmitted in a $0^{th}$ and a $5^{th}$ subframe. More specifically, the PSS is transmitted on the last ODFM symbol of a first slot of the 0$^{th}$ subframe and the last OFDM symbol of a first slot of the 5$^{th}$ subframe, respectively. And, the SSS is transmitted on the last but one OFDM symbol of the first slot of the 0$^{th}$ subframe and the last but one OFDM symbol of the first slot of the 5$^{th}$ subframe, respectively. In particular, the SSS is transmitted on an OFDM symbol right before an OFDM symbol on which the PSS is transmitted. The aforementioned transmission timing corresponds to a FDD case. In case of TDD, the PSS is transmitted on a third symbol of the 1$^{st}$ subframe and a third symbol of a 6$^{th}$ subframe (i.e., DwPTS) and the SSS is transmitted on the last symbol of a 0$^{th}$ subframe and the last symbol of a 5$^{th}$ subframe. In particular, the SSS is transmitted on a symbol preceding as many as 3 symbols of a symbol on which the PSS is transmitted in the TDD.

The PSS corresponds to a Zadoff-Chu sequence of a length of 63. The PSS is actually transmitted on 73 center subcarriers (72 subcarriers except a DC subcarrier, i.e., 6 RBs) of a system frequency bandwidth in a manner that 0 is padding to both ends of the sequence. The SSS consists of a sequence of a length of 62 in a manner that two sequences each of which has a length of 31 are frequency-interleaved. Similar to the PSS, the SSS is transmitted on the center 72 subcarriers of the whole system bandwidth.

PBCH (Physical Broadcast Channel)

Figure 7:
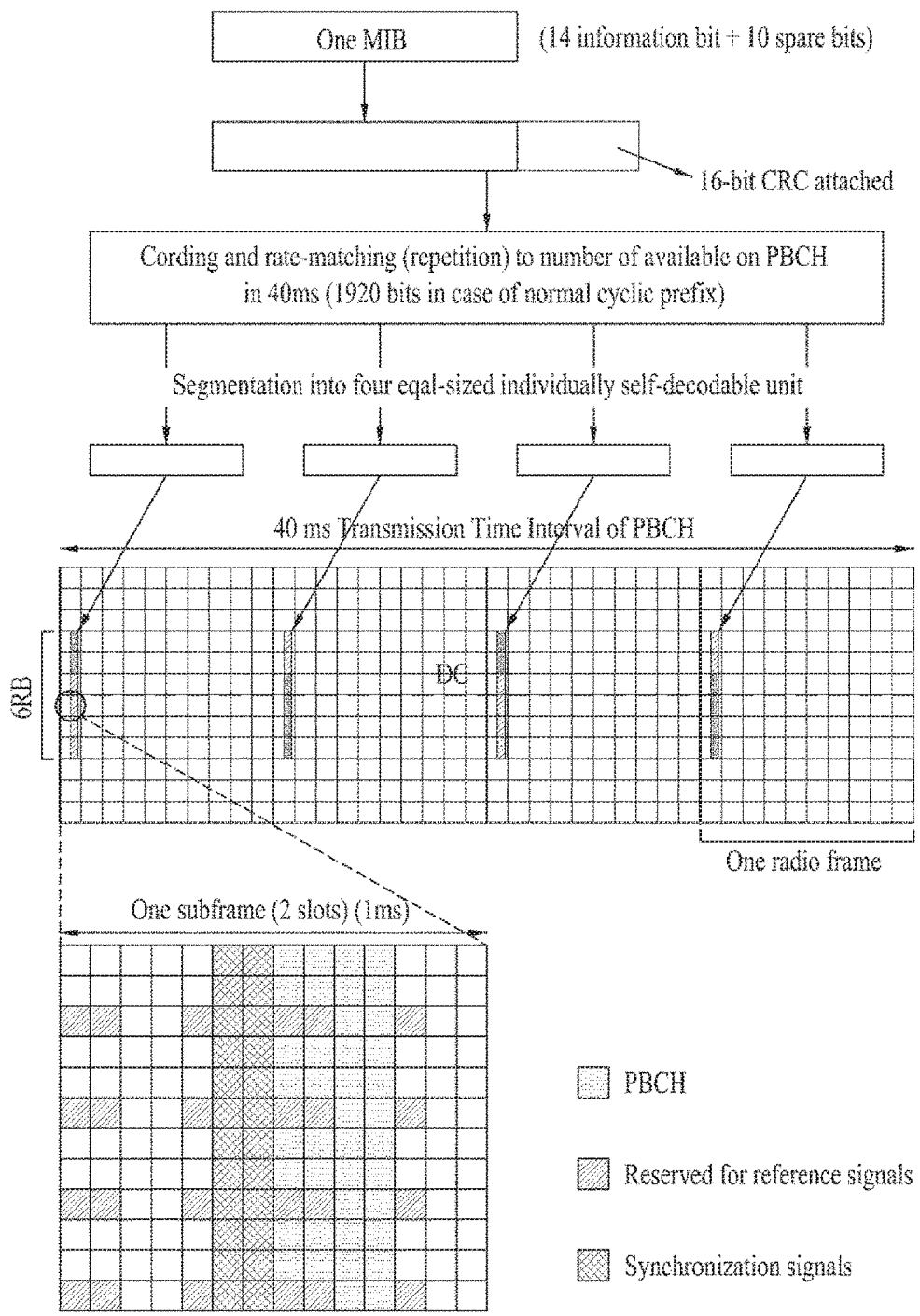
FIG. 7 is a diagram of PBCH of a 3GPP system.

FIG. 7 is a diagram for explaining PBCH. The PBCH corresponds to a channel on which system information corresponding to a master information block (MIB) is transmitted. The PBCH is used to obtain system information after a user equipment obtains synchronization and a cell identifier via the aforementioned PSS/SSS. In this case, downlink cell bandwidth information, PHICH configuration information, a subframe number (a system frame number (SFN)) and the like can be included in the MIB.

As shown in FIG. 7, one MIB transport block is transmitted via a first subframe in each of 4 consecutive radio frames. More specifically, PBCH is transmitted on first 4 OFDM symbols of a second slot of a 0$^{th}$ subframe in the 4 consecutive radio frames. Hence, the PBCH configured to transmit a MIB is transmitted with an interval of 40 ms. The PBCH is transmitted on center 72 subcarriers of a whole bandwidth in frequency axis. The center 72 subcarriers correspond to 6 RBs corresponding to a smallest downlink bandwidth. This is intended to make a user equipment decode BCH without any problem although the user equipment does not know a size of the whole system bandwidth.

Initial Access Procedure

Figure 8:
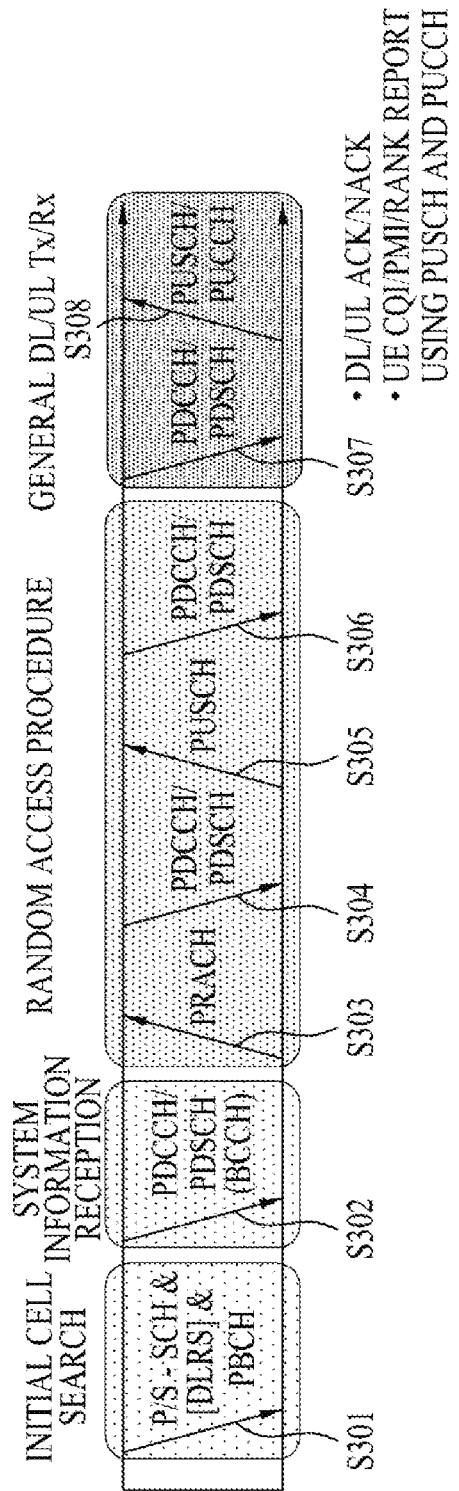
FIG. 8 is a diagram to describe an initial access procedure and signal transceiving method of a 3GPP system.

FIG. 8 is a diagram to describe an initial access procedure and signal transceiving method of a 3GPP system.

If a power of a UE is turned on or the UE newly enters a cell, the UE performs an initial cell search for matching synchronization with a base station and the like [S301]. To this end, the UE receives PSS and SSS from the base station, matches synchronization with the base station and then obtains information such as a cell ID and the like. Subsequently, the UE receives PBCH (physical broadcast channel) from the base station and is then able to obtain intra-cell broadcast information. Meanwhile, the UE receives a downlink reference signal (DL RS) in the initial cell searching step and is then able to check a downlink channel status.

Having completed the initial cell search, the UE receives a physical downlink control channel (PDCCH) and a physical downlink shared control channel (PDSCH) according to information carried on the physical downlink control channel (PDCCH) and is then able to obtain system information in further detail [S302].

Meanwhile, if the UE initially accesses the base station or fails to have a radio resource for signal transmission, the UE may perform a random access procedure (RACH) on the base station [steps S303 to S306]. To this end, the UE transmits a specific sequence as a preamble via a physical random access channel (PRACH) [S303, S305] and is then able to receive a response message via PDCCH and a corresponding PDSCH in response to the preamble [S304, S306]. In case of contention based RACH, a contention resolution procedure may be performed in addition.

Having performed the above mentioned procedures, the UE may perform PDCCH/PDSCH reception [S307] and PUSCH/PUCCH (physical uplink shared channel/physical uplink control channel) transmission [S308] as a general uplink/downlink signal transmission procedure. In particular, the UE receives a downlink control information (DCI) via PDCCH. In this case, the DCI includes such control information as resource allocation information on a UE and may differ in format in accordance with the purpose of its use.

Meanwhile, control informations transmitted to or received from the base station by the UE include DL/UL ACK/NACK signal, CQI (channel quality indicator), PMI (precoding matrix index), RI (rank indicator) and the like. In case of the 3GPP LTE system, the UE may transmit the above-mentioned control informations such as CQI, PMI, RI and the like via PUSCH and/or PUCCH.

D2D (Device to Device) Communication Environment

D2D communication means a direct communication between UEs, and a term 'D2D' may be substituted with or used interchangeably with a term 'sidelink'. D2D UE means US supportive of D2D. UE may mean D2D UE unless legacy UE is mentioned specially.

In D2D communication, the coverage of an eNB can be increased through a relay UE or a coverage hole and the like can be overcome. According to embodiments of the present invention, for a communication between an eNB and a UE unable to directly receive a signal from the eNB, methods of selecting a relay UE are proposed. The following description is made by focusing on a method for relaying a communication between an eNB and a UE, by which the present invention is non-limited. And, embodiments of the present invention are applicable for a communication between UEs that configure a D2D pair.

Figure 9:
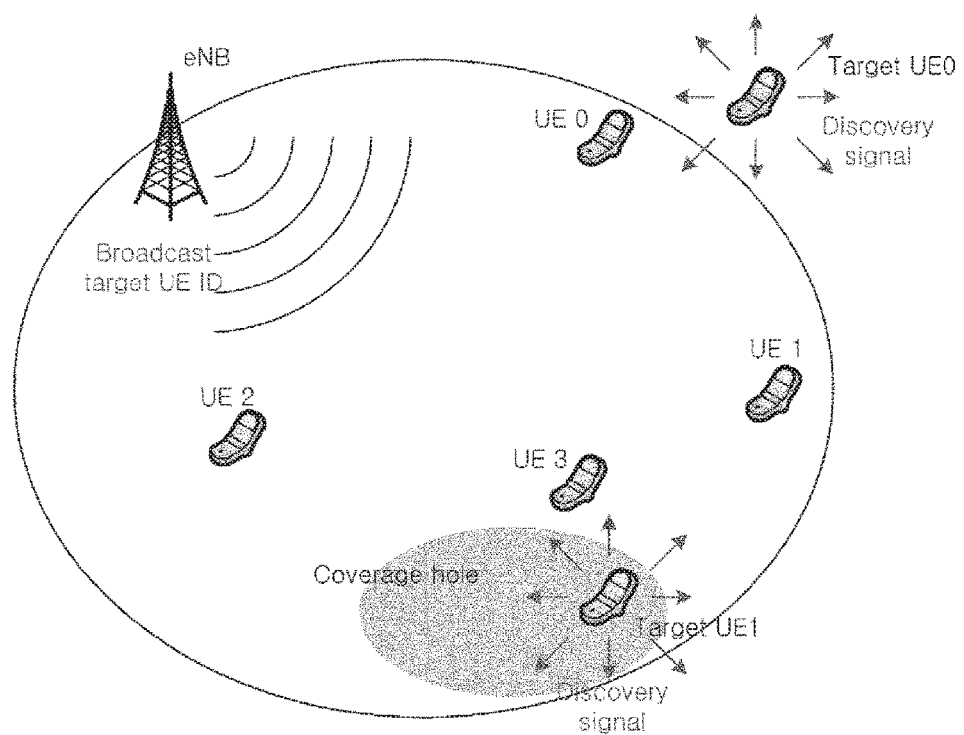
FIG. 9 is a diagram to describe D2D communication according to one embodiment of the present invention.

FIG. 9 is a diagram to describe D2D communication according to one embodiment of the present invention.

Referring to FIG. 9, Target UE is D2D UE requiring a relaying of a relay UE. Target UE0 is assumed as located out of a coverage of an eNB. And, Target UE1 is assumed as located at a coverage hole within the coverage. Hence, the Target UEs (Target UE0, Target UE1) are unable to perform direct communication with the eNB, and a relay UE is necessary for the communication with the eNB.

If Target UEs are D2D UEs supportive of D2D, the Target UEs send discovery signals at a specific timing. UEs located around the Target UEs detect the discovery signals and are then aware that the Target UEs are located around them. Meanwhile, signals sent by the Target UEs are non-limited by the discovery signals. Signals (e.g., Scheduling Assignment, D2D data, etc.) containing or inferring IDs (or informations corresponding to IDs) of the Target UEs can be sent from the Target UEs.

D2D UE Category

A UE category for eNB-UE communication is defined in 3GPP TS36.306. When a network requests to report eNB-UE category, a UE reports the eNB-UE category of the UE to the network. The eNB-UE category may correspond to an amount of UL/DL data capable of being processed by the UE per unit time. For example, the eNB-UE category can be represented by the number of layers capable of being supported by the UE. More specifically, table 1 shows DL parameters indicated by the eNB-UE category defined in TS36.306.

TABLE 1

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| Category 0 (Note 2) | 1000 | 1000 | 25344 | 1 |
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |
| Category 9 | 452256 | 149776 (4 layers) 75376 (2 layers) | 5481216 | 2 or 4 |
| Category 10 | 452256 | 149776 (4 layers) 75376 (2 layers) | 5481216 | 2 or 4 |

NOTE 1:
In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.
NOTE 2:
Within one TTI, a UE indicating category 0 shall be able to receive up to 1000 bits for a transport block associated with C-RNTI/P-RNTI/SI-RNTI/RA-RNTI and up to 2216 bits for another transport block associated with P-RNTI/SI-RNTI/RA-RNTI Compared to legacy eNB-UE communication, various synchronization timings may exist in D2D communication. For example, synchronization timings may not be aligned among a plurality of D2D UEs. If all of the D2D UEs belong to in-coverage, the D2D UEs can be aligned on the basis of a synchronization timing of an eNB. However, if a part of the D2D UEs is located at out-of-coverage and is unable to follow the synchronization timing of the eNB, the synchronization timings of the D2D UEs can be differently configured.

If a case of receiving data from links having a different QCL assumption (quasi co-location assumption) (a case of receiving data from TPs of eNBs incapable of assuming QCL) is excluded, eNB-UE communication considers an eNB-UE link capable of being regarded as a single link or an eNB-UE link corresponding to an actual single link. Hence, it may be able to define eNB-UE category on the basis of a size of data capable of being transceived with an eNB per unit time via a single link.

On the contrary, in order for a UE to define a size of data capable of being transceived with different UEs per unit time in D2D communication, it is necessary to consider whether or not synchronization timings are aligned and/or a D2D resource. Hence, a UE category for D2D communication of a D2D UE (hereinafter, D2D UE category) can be defined in a manner of being different from an eNB-UE category. In the following, classification of the D2D UE category is explained according to one embodiment of the present invention. For clarity, the following embodiments are indexed. At least a part of the embodiments having a different index can be combined with each other or can be implemented independently.

Embodiment 1. D2D UE Category Considering Synchronization

A D2D UE category can be defined according to the number of asynchronous links capable of being simultaneously processed by a UE. For example, a D2D UE category can be defined according to the number of FFT operations capable of being simultaneously processed by a UE.

Specifically, in case of eNB-UE category 6 and the like shown in Table 1, since multi-layer transmission corresponds to a synchronous link, a sampling period (e.g., a time window) of data corresponding to a target of FFT operation is identically set to multiple layers. Since a single FFT operation corresponding to a single time window is performed only, the number of FFT operations is not considered in classifying the eNB-UE category.

However, since it is necessary to individually set a time window for FFT operation to asynchronous links, the number of FFT operations capable of being simultaneously processed can be considered in classifying the D2D UE category.

Meanwhile, whether a link corresponds to an asynchronous link or a synchronous link in D2D communication can be determined as follows. For example, if a space of a subframe boundary between links exists within a prescribed range, the links can be defined as synchronous links. Otherwise, the links can be defined as asynchronous links. The definition on the synchronous/asynchronous links can be commonly applied to other embodiments as well.

Meanwhile, if a D2D UE category is classified in consideration of the number of links capable of being simultaneously processed only, the total of data size (e.g., data rate) received during unit time via D2D communication links instantaneously and considerably increases and may deviate from a range capable of being processed by a D2D UE. Or, the total of the data rate may instantaneously and considerably decrease and processing capability of the D2D UE can be wasted.

Figure 10:
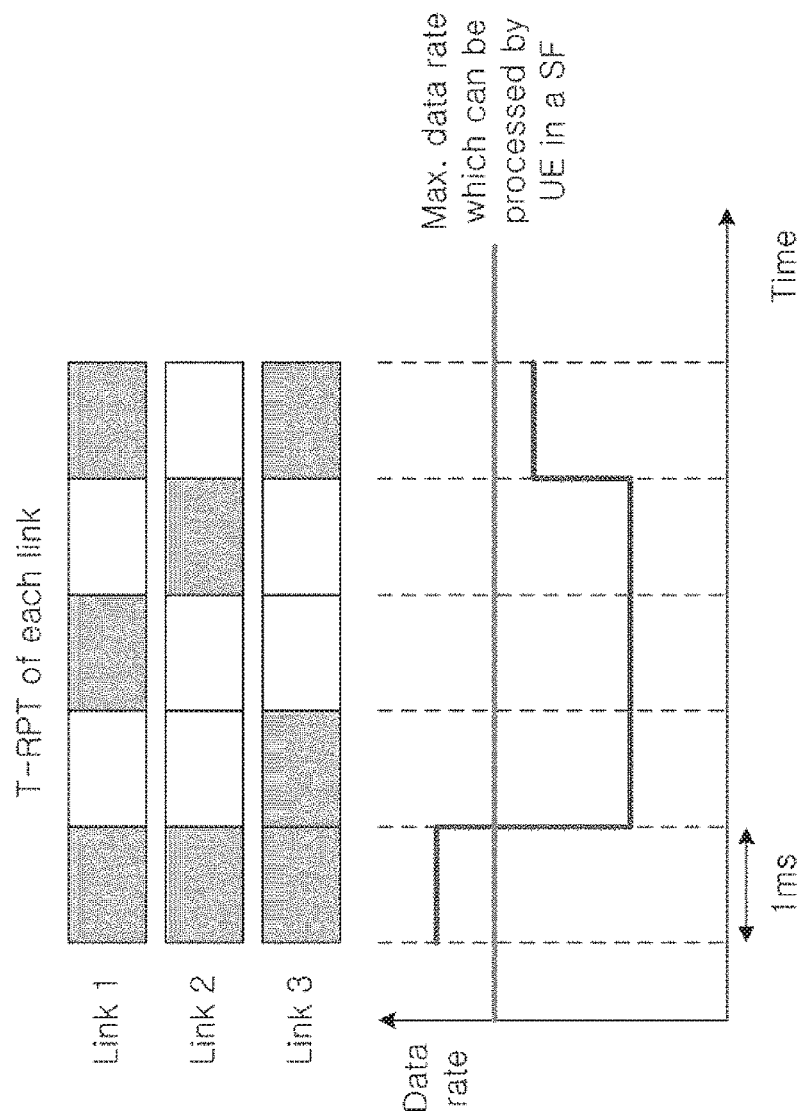
FIG. 10 is a diagram for a data rate of synchronous links according to one embodiment.

FIG. 10 is a diagram for a data rate of synchronous links according to one embodiment. FIG. 10 shows an example that 3 D2D links have a different T-RPT (time-resource pattern). In this case, the T-RPT corresponds to a pattern of a time resource capable of being used for D2D communication. In the present embodiment, for clarity, assume that a unit of the T-RPT corresponds to 1 ms (e.g., 1 subframe). Yet, a different time length can be configured as a minimum unit as well. Although FIG. 10 illustrates a case that 1 T-RPT is configured by '1 ms×5', 1 T-RPT can also be configured by '1 ms×random positive integer N'. In FIG. 10, TTIs represented by shade corresponds to time resources capable of being used for D2D communication.

In FIG. 10, assume that a transmission/reception size per TTI of each synchronous link is the same. If a D2D UE category is defined based on an average of links at which a collision (overlap) of T-RPT occurs, in some cases, a data exceeding a maximum size capable of being processed by a D2D UE can be transmitted to a UE at specific TTI.

More specifically, transmissions of two links (link 2 and link 3) are overlapped with transmission of a link 1 at first TTI and transmission of one link (link 3) is overlapped with the transmission of the link 1 at the last TTI. Meanwhile, transmission of one link is performed at the remaining TTIs.

Since transmissions of total 3 links are overlapped at 5 TTIs in total, it is able to calculate an average of transmission per TTI such as 'transmission of 1 link+transmission of overlapped 0.6 link (3/5 link per TTI)=1.6 link'.

Hence, if such a number as an average data rate (e.g., 1.6×k, where k denotes data rate per link) corresponding to 1.6 link is considered only, it may make a mistake that a D2D UE capable of simultaneously processing 2 links is able to process the transmission shown in FIG. 10. However, when the D2D UE receives data, overflow occurs. In particular, since there are data transmissions for 3 links at the first TTI while the D2D UE is able to process maximum 2 links, the D2D UE may fail to receive data of 1 link.

For clarity, FIG. 10 illustrates synchronous links. Yet, in case of asynchronous links, a complex problem may occur. Referring to FIG. 10, a data rate is constantly maintained in TTI. However, if data are received from asynchronous links, data rate fluctuation may occur in a unit TTI.

Figure 11:
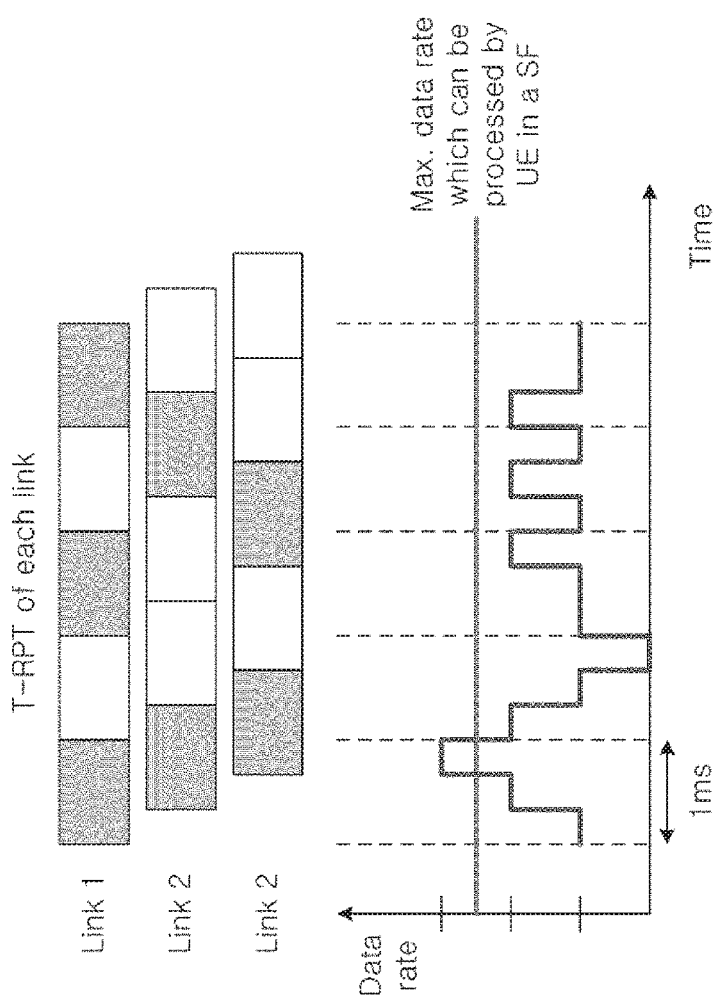
FIG. 11 is a diagram for a data rate of asynchronous links according to one embodiment.

FIG. 11 is a diagram for a data rate of asynchronous links according to one embodiment.

Referring to FIG. 11, if D2D signals are received from asynchronous links, a data rate is fluctuated in a unit TTI (e.g., 1 subframe). Data can be transmitted at the first TTI in a manner of instantaneously exceeding a maximum data rate capable of being processed by a UE. In particular, if the number of synchronous links and/or asynchronous links capable of being processed by a UE is considered only, the aforementioned problem may occur.

Meanwhile, in FIGS. 10 and 11, a data rate per link, which is identically assumed for the links, may correspond to a maximum data rate supported by each link, by which the present invention may be non-limited.

Embodiment 2. D2D UE Category Considering Data Capacity

In order to improve the defect mentioned earlier in the embodiment 1, it may consider data capacity capable of being processed per TTI (e.g., data rate) to determine a D2D UE category.

For example, it may solely consider the data capacity or consider the data capacity together with the number of links capable of being processed.

A reference for the data capacity can be applied according to a unit resource or can be applied to an instantaneous data rate. For example, if the reference for the data capacity is applied according to a unit resource, a D2D UE category can be determined in consideration of an average data rate in the unit resource. Referring to FIG. 11, if an average data rate of a first TTI (e.g., 1$^{st}$ subframe) does not exceed a maximum allowable value (e.g., data capacity of a D2D UE) of a UE, a D2D UE of a corresponding D2D UE category is classified as a D2D UE capable of processing all data received from 3 links. If the reference for the data capacity is applied to the instantaneous data rate, a D2D UE of a corresponding D2D UE category is classified as a D2D UE capable of processing data received from 2 links at the first TTI (e.g., 1$^{st}$ subframe).

A D2D UE category can be determined based on a data rate capable of being processed per link. For example, similar to eNB-UE category, the D2D UE category can be determined based on the number of bits capable of being processed per unit time.

According to a different embodiment of the present invention, it may consider an aggregated signal of D2D signals transmitted from a plurality of data sources irrespective of the number of D2D links. For example, a D2D UE category can be determined based on at least one of a maximum and/or minimum data rate for the aggregated signal and maximum and/or minimum power for the aggregated signal. According to the present embodiment, it may be able to support links having a different data rate. In particular, the present embodiment is more flexible than the aforementioned embodiments.

Embodiment 3. D2D Category According to D2D Operation Type

As a further different method for determining a D2D UE category, it may consider a type of a D2D operation. The D2D operation can include at least one selected from the group consisting of a D2D discovery operation, a D2D communication operation, and a D2D relaying operation, by which the present invention may be non-limited.

Since discovery is performed to notify the existence of a UE to a nearby UE, content of data transmitted by the UE does not change or may be semi-static. A constraint on detection time, e.g., time until a D2D UE is detected after a discovery signal is received, is mitigated compared to D2D communication.

For example, if a D2D UE is able to process a single D2D signal only during a prescribed time, for example, if it is unable to perform multiple FFT operations in parallel, D2D communication can process data transmission and reception for a single D2D link only. On the contrary, according to the discovery operation, a D2D UE can sequentially detect two discovery signals via two discovery periods. For example, the D2D UE stores a firstly received discovery signal in a buffer of the D2D UE. If a second discovery signal is received, the D2D UE sequentially performs an FFT operation on the two discovery signals.

Hence, a D2D UE category for the discovery operation and a D2D UE category for the D2D communication operation can be separately defined or a D2D UE category can be defined by combining the two D2D UE categories with each other. For example, a D2D UE category can be defined in a form such as Table 2 in the following.

TABLE 2

| D2D category | # of discovery | # of communication |
|---|---|---|
| 1 | 2 | 1 |
| 2 | 3 | 2 |
| 3 | 4 | 2 |

Embodiment 4. Operations of D2D UE and eNB According to D2D UE Category

A D2D UE category is determined based on at least one of the aforementioned embodiments and each D2D UE can report a D2D UE category of the UE to an eNB.

The eNB can transmits an RRC message for requesting a D2D UE category to a D2D UE (e.g., SidelinkUECapabilityEnquiry). The D2D UE category can be reported together with eNB-UE category report (UECapabilityInformation) or can be performed separately. For example, if the eNB-UE category report is performed first, the D2D UE can report the D2D UE category to the eNB via a response message in response to system information (e.g., system information block 19/19) including a D2D resource pool received from the eNB. Or, the D2D UE can report the D2D UE category to the eNB via a separate RRC message (e.g., SidelinkUE-CapabilityInformation). Meanwhile, the eNB can transmit information on a D2D UE category supported by the eNB to the D2D UE via system information or RRC signaling.

The eNB can schedule a D2D relay operation and the like based on the D2D UE category reported by the D2D UE.

(1) For example, when a D2D UE1 located at a coverage boundary of a serving cell relays communications of two UEs (D2D UE2 and D2D UE3) located at out-of-coverage, assume that synchronization of a D2D link 1 between the D2D UE1 and the D2D UE2 and synchronization of a D2D link 2 between the D2D UE1 and the D2D UE3 are not matched with synchronization of the serving cell and the synchronization is different between the D2D link 1 and the D2D link 2. Meanwhile, since the D2D UE1 is located at the in-coverage, assume that he D2D UE1 has obtained the synchronization of the serving cell.

If a D2D UE category reported by the D2D UE1 indicates that it is able to relay two or more asynchronous links, the serving cell can relay a broadcast signal to be forwarded to the out-of-coverage via the D2D UE1. The serving cell can transmit the broadcast signal to the UE1 according to the synchronization of the serving cell. Meanwhile, the serving cell can separately transmit the broadcast signal to be relayed to the D2D UE1. According to a different embodiment, the serving cell can transmit an indicator to the D2D UE1 to indicate the UE1 to relay the broadcast signal instead of separately transmitting the broadcast signal. The D2D UE1 receives the broadcast signal according to a broadcast timing of the serving cell and may be able to transmit the broadcast signal to the out-of-coverage via D2D links. In the present embodiment, the broadcast signal is illustrated for clarity. It may be able to relay a unicast signal, a signal having a multicast attribute, control information, or data as well.

Meanwhile, it may be able to initiate the D2D relay according to a request of the D2D UE1 or a request of the eNB. According to an embodiment that the D2D UE1 requests for relaying, the D2D relay can be performed when the D2D UE1 receives a D2D signal (e.g., discovery signal) from the D2D UE2 or the D2D UE3 and the D2D UE2 or the D2D UE3 is located at the out-of-coverage. For example, whether or not the D2D UE2 or the D2D UE3 is located at the out-of-coverage can be indicated by a D2D signal.

According to a different embodiment, the eNB transmits paging to the D2D UE2 or the D2D UE3. If a response is not received from the D2D UE2 or the D2D UE3 in response to the paging, the eNB can indicate the D2D UE1 to relay the paging to the D2D UE2 or the D2D UE3. According to a further different embodiment, the eNB transmits paging to the D2D UE2 or the D2D UE3. If the D2D UE1 receives the paging, the D2D UE1 can directly make a response to the paging or may be able to relay the paging to the D2D UE2 or the D2D UE3 to initiate the D2D relay. It may be able to use a broadcast signal or a multicast signal rather than the paging, by which the present invention may be non-limited.

(2) An eNB located at out-of-coverage can select a relay D2D UE to communicate with a D2D UE requiring relaying (hereinafter, target UE). D2D UEs capable of performing a relay operation (hereinafter, relaying capable UE) measure specific signals (e.g., discovery signal) of D2D UEs located at the out-of-coverage to determine out-of-coverage D2D UE(s) capable of communicating with the relaying capable UEs. The relaying capable UEs report the out-of-coverage D2D UE(s) capable of communicating with the relaying capable UEs to the eNB. The eNB can select a relay D2D UE to relay a target UE based on the report and a D2D UE category reported by the relaying capable UEs in advance or the D2D UE category reported upon the request of the eNB.

Figure 12:
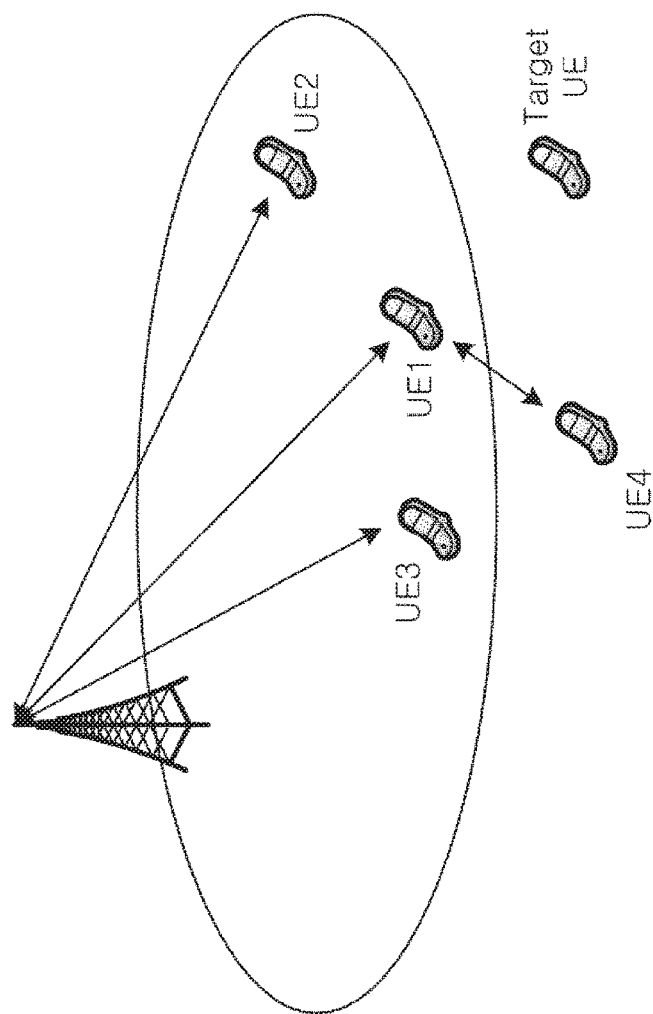
FIG. 12 is a diagram for a radio communication environment according to one embodiment of the present invention.

FIG. 12 is a diagram for a radio communication environment according to one embodiment of the present invention.

Assume that no link is established between a D2D UE2/3 and an out-of-coverage D2D UE and a D2D UE1 currently performs D2D communication with an out-of-coverage D2D UE4.

If an eNB asks in-coverage D2D UEs to report link quality with a target UE, each of the D2D UE1, the D2D UE2, and the D2D UE3 can report a measurement result of a discovery signal transmitted by the target UE to the eNB.

In the present embodiment, when the discovery signal of the target UE is measured, assume that good link quality is reported in an order of D2D UE1>D2D UE3>D2D UE2. If a D2D UE category of the D2D UE1 indicates that the D2D UE1 is able to process a plurality of links, the eNB can select the D2D UE1 as a relay D2D UE for performing communication with the target UE. On the contrary, if the D2D UE1 is able to process a single link only, the eNB can select the D2D UE3 having a second highest measurement result as the relay D2D UE.

Figure 13:
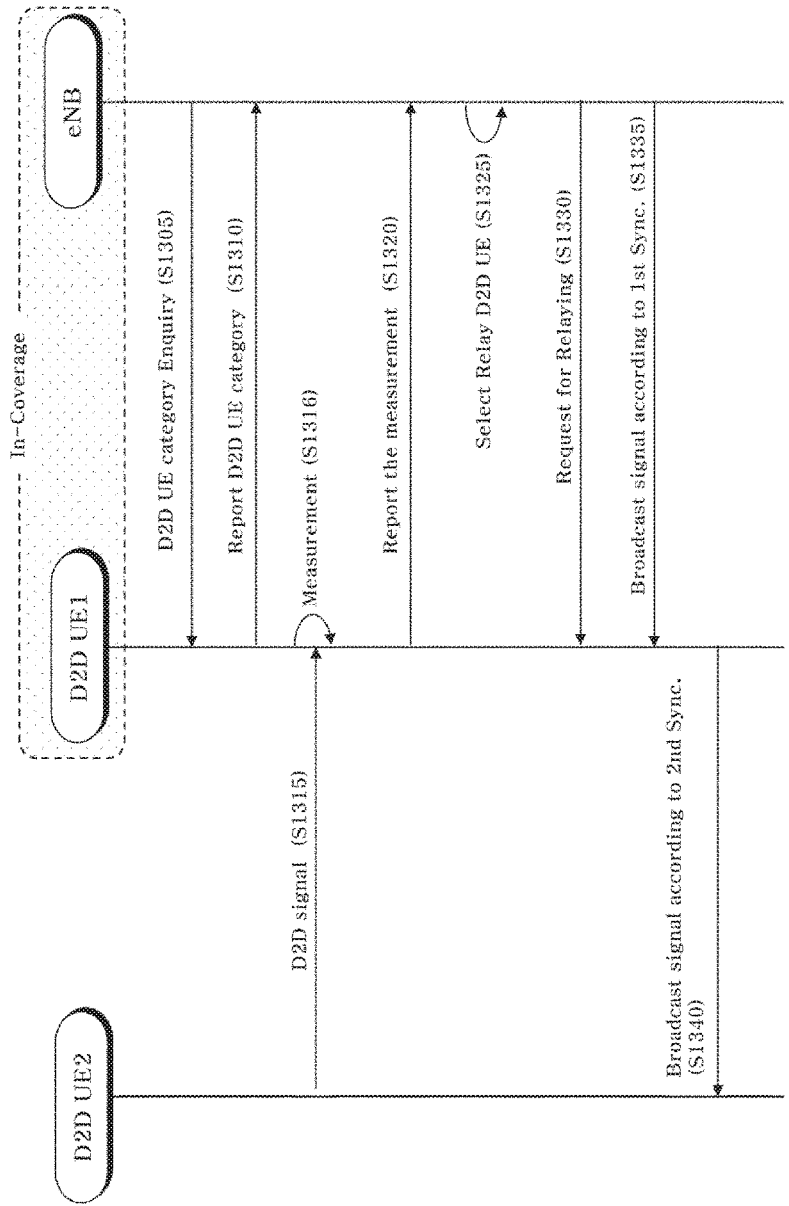
FIG. 13 is a flowchart for a method of transmitting and receiving a signal according to one embodiment of the present invention.

FIG. 13 is a flowchart for a method of transmitting and receiving a signal according to one embodiment of the present invention. Explanation on contents overlapped with the aforementioned contents is omitted. Assume that a D2D UE1 is located at in-coverage and a D2D UE2 is located at out-of-coverage.

First of all, the D2D UE1 receives, from a base station, a message which requests reporting of a UE category of the D2D UE1 [S1305].

The D2D UE1 reports the D2D UE category for a D2D operation of the D2D UE1 to the base station, the D2D UE category being configured independently of a UE category for communication with the base station[S1310]. The D2D UE category can be configured based on a number of fast Fourier transform (FFT) operations for asynchronous D2D links capable of being simultaneously processed by the D2D UE1 and a data rate for asynchronous D2D links capable of being processed per unit time by the D2D UE1.

The D2D UE category can be differently configured for a case that the D2D UE1 performs D2D communication with an another D2D UE and a case that the D2D UE1 performs a discovery operation on a D2D UE2.

The D2D UE1 receives a D2D signal from a D2D UE2 located at the outside of the coverage of the base station [S1315]. The D2D signal may correspond to a discovery signal, by which the present invention may be non-limited.

The D2D UE1 measures the received D2D signal [S1316].

The D2D UE1 reports a measurement result of the D2D signal to the base station [S1320].

The base station selects a D2D UE to relay the D2D UE2 based on the measurement result of the D2D signal measured by the D2D UE1 and the D2D UE category [S1325]. If the D2D UE category reported by the D2D UE1 indicates that the D2D UE1 is able to process FFT operation on at least two asynchronous links at the same time, the D2D UE1 can operate as a relay for the D2D UE2.

The D2D UE1 receives, from the base station, a message which requests relaying of the D2D UE2 [S1330].

The D2D UE1 receives a broadcast signal from the base station based on a first synchronization timing [S1335]. The first synchronization timing may correspond to a synchronization timing of the base station.

The D2D UE1 relays the broadcast signal to the D2D UE2 at a second synchronization timing different from the first synchronization timing [S1340].

Apparatus According to Embodiments of the Present Invention

Figure 14:
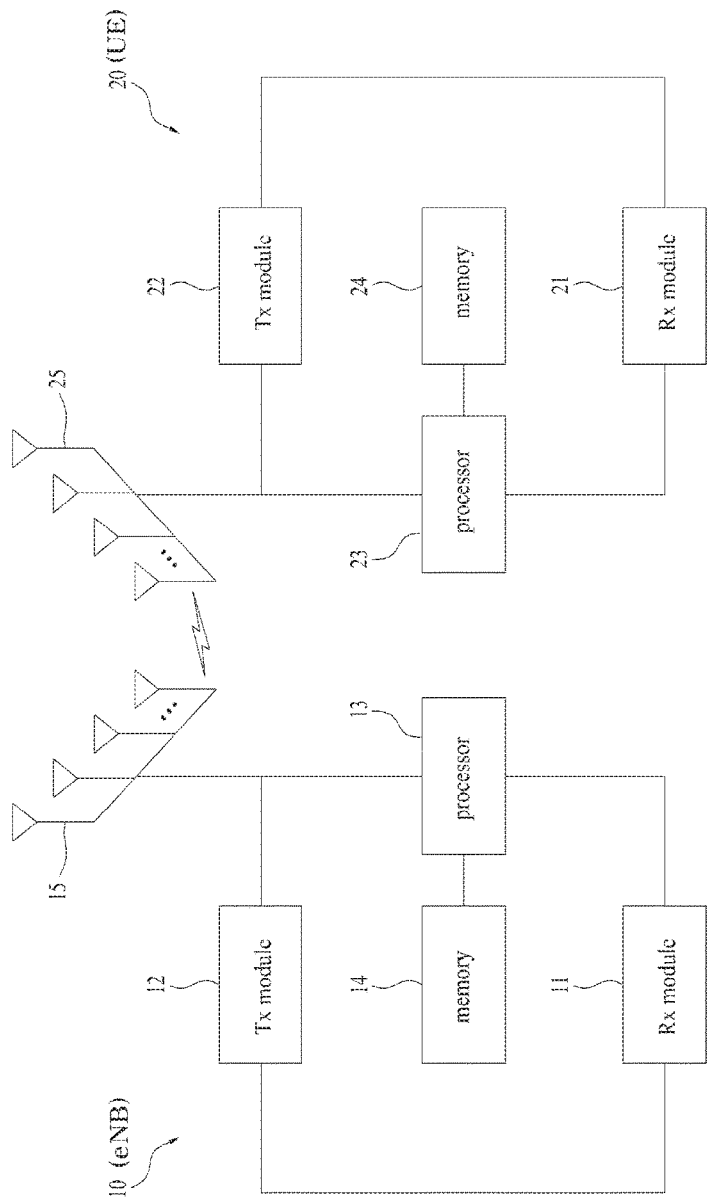
FIG. 14 is a diagram for a configuration of a transceiver according to one embodiment of the present invention.

FIG. 14 is a diagram for a user equipment and a transmission point according to one embodiment of the present invention. The user equipment and the transmission point shown in FIG. 13 can perform the aforementioned embodiments.

Referring to FIG. 14, a transmission point 10 can include a reception module 11, a transmission module 12, a processor 13, a memory 14 and a plurality of antennas 15. A plurality of the antennas 15 correspond to a transmission point supporting MIMO transmission and reception. The reception module 11 can receive various signals, data and information from the user equipment in UL. The transmission module 12 can transmit various signals, data and information to the user equipment in DL. The processor 13 can control overall operation of the transmission point 10.

The processor 13 of the transmission point 10 can process items necessary for each of the aforementioned embodiments.

Besides, the processor 13 of the transmission point 10 performs a function of calculating and processing information received by the transmission point 10, information to be transmitted to the external and the like. The memory 14 can store processed information for prescribed time and can be replaced with such a configuration element as a buffer (not depicted).

Referring to FIG. 14, a user equipment 20 can include a reception module 21, a transmission module 22, a processor 23, a memory 24 and a plurality of antennas 25. A plurality of the antennas 25 correspond to a UE supporting MIMO transmission and reception. The reception module 21 can receive various signals, data and information from the base station or a D2D UE in DL. The transmission module 22 can transmit various signals, data and information to the base station or the D2D UE in UL. The processor 23 can control overall operation of the user equipment 1420.

The processor 23 of the user equipment 20 can process items necessary for each of the aforementioned embodiments.

Besides, the processor 23 of the user equipment 20 performs a function of calculating and processing information received by the user equipment 1420, information to be transmitted to the external and the like. The memory 1424 can store processed information for prescribed time and can be replaced with such a configuration element as a buffer (not depicted).

For a concreate configuration of the user equipment and the transmission point, items mentioned earlier in various embodiments of the present invention can be independently applied or two or more embodiments can be applied at the same time. For clarity, explanation on contents overlapped with the aforementioned contents is omitted.

And, in explaining FIG. 14, if a relay becomes a downlink transmission entity from the transmission point 10 or an uplink reception entity to the transmission point, or the relay becomes a downlink reception entity from the UE or an uplink transmission entity to the UE, the principle of the present invention can also be identically applied to the relay via various embodiments of the present invention.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

What is claimed is:

1. A method of transmitting a signal by a device to device (D2D) user equipment (UE) supporting D2D communication, the method comprising:
receiving, from a base station, a message which requests reporting of a UE category of the D2D UE; and
reporting a D2D UE category for a D2D operation of the D2D UE, the D2D UE category being configured independently of a UE category for communication with the base station,
wherein the D2D UE category is configured based on a number of fast Fourier transform (FFT) operations for asynchronous D2D links capable of being simultaneously processed by the D2D UE and a data rate for the asynchronous D2D links capable of being processed per unit time by the D2D UE.

2. The method of claim 1, wherein the D2D UE category is differently configured for a case that the D2D UE performs D2D communication with an another D2D UE and a case that the D2D UE performs a discovery operation on the another D2D UE.

3. The method of claim 1, wherein if the reported D2D UE category indicates that the D2D UE is able to process FFT operation for at least two asynchronous links at a same time, the D2D UE operates as a relay for an another D2D UE.

4. The method of claim 1, further comprising:
receiving, from the base station, a message which requests relaying of an another D2D UE located at an outside of a coverage of the base station; and
relaying a broadcast signal received from the base station to the another D2D UE having a synchronization timing different from a synchronization timing of the base station.

5. The method of claim 1, further comprising:
measuring a D2D signal received from an another D2D UE located an outside of a coverage of the base station;
reporting a measurement result of the D2D signal to the base station; and
receiving a message which requests relaying of the another D2D UE based on the reported measurement result of the D2D signal and the reported D2D UE category.

6. A method of receiving a signal by a base station from a device to device (D2D) user equipment (UE) supporting D2D communication, the method comprising:
transmitting a message which requests reporting of a UE category to the D2D UE; and
receiving a report on a D2D UE category for a D2D operation of the D2D UE, the D2D UE category being configured independently of a UE category for communication with the base station,
wherein the D2D UE category is configured based on a number of fast Fourier transform (FFT) operations for asynchronous D2D links capable of being simultaneously processed by the D2D UE and a data rate for the asynchronous D2D links capable of being processed per unit time by the D2D UE.

7. The method of claim 6, wherein the D2D UE category is differently configured for a case that the D2D UE performs D2D communication with an another D2D UE and a case that the D2D UE performs a discovery operation on the another D2D UE.

8. The method of claim 6, wherein the D2D UE operates as a relay for an another D2D UE only when the reported D2D UE category indicates that the D2D UE is able to process FFT operation for at least two asynchronous links at a same time.

9. The method of claim 6, further comprising:
transmitting, to the D2D UE, a message which requests relaying of an another D2D UE located at an outside of a coverage of the base station,
wherein a broadcast signal transmitted by the base station is relayed to the another D2D UE having a synchronization timing different from a synchronization timing of the base station.

10. The method of claim 6, further comprising:
receiving a measurement result for a D2D signal of an another D2D UE located an outside of a coverage of the base station; and
transmitting a message which requests relaying of the another D2D UE based on the measurement result for the D2D signal and the reported D2D UE category.

11. A device to device (D2D) user equipment (UE) supporting D2D communication, the D2D UE comprising;
a receiver configured to receive, from a base station, a message which requests reporting of a UE category of the D2D UE; and
a processor configured to report a D2D UE category for a D2D operation of the D2D UE, the D2D UE category being configured independently of a UE category for communication with the base station,
wherein the D2D UE category is configured based on a number of fast Fourier transform (FFT) operations for asynchronous D2D links capable of being simultaneously processed by the D2D UE and a data rate for the asynchronous D2D links capable of being processed per unit time by the D2D UE.

12. The D2D UE of claim 11, wherein the D2D UE category is differently configured for a case that the D2D UE performs D2D communication with an another D2D UE and a case that the D2D UE performs a discovery operation on the another D2D UE.

13. The D2D UE of claim 11, wherein if the reported D2D UE category indicates that the D2D UE is able to process FFT operation for at least two asynchronous links at a same time, the D2D UE operates as a relay for an another D2D UE.

14. The D2D UE of claim 11,
wherein the receiver receives, from the base station, a message which requests relaying of an another D2D UE located at an outside of a coverage of the base station and
wherein the processor relays a broadcast signal received from the base station to the another D2D UE having a synchronization timing different from a synchronization timing of the base station.

15. The D2D UE of claim 11,
wherein the processor measures a D2D signal received from an another D2D UE located an outside of a coverage of the base station and reports a measurement result of the D2D signal to the base station and
wherein the receiver receives a message which requests relaying of the another D2D UE based on the reported measurement result of the D2D signal and the reported D2D UE category.

* * * * *